(12) United States Patent
Yamada

(10) Patent No.: US 10,782,123 B2
(45) Date of Patent: Sep. 22, 2020

(54) MEASUREMENT APPARATUS AND MEASUREMENT SYSTEM

(71) Applicant: DMG MORI CO., LTD., Yamatokoriyama-shi (JP)

(72) Inventor: Tomoaki Yamada, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 0 days.

(21) Appl. No.: 16/442,673

(22) Filed: Jun. 17, 2019

(65) Prior Publication Data

US 2020/0003552 A1 Jan. 2, 2020

(30) Foreign Application Priority Data

Jun. 29, 2018 (JP) .................................. 2018-124423

(51) Int. Cl.
*G01B 11/24* (2006.01)

(52) U.S. Cl.
CPC .................... *G01B 11/24* (2013.01)

(58) Field of Classification Search
CPC .. G01B 21/047; G01B 5/008; G01B 2210/58; G01B 7/004; G05B 2219/34306; G06F 1/3228; G06F 1/3212; G06F 1/32
USPC ............ 356/601–623; 713/320, 330; 33/558; 340/686.5, 636.1, 539.3
See application file for complete search history.

(56) References Cited

U.S. PATENT DOCUMENTS

| | | | |
|---|---|---|---|
| 4,658,509 A | 4/1987 | Juengel | |
| 5,948,105 A | 9/1999 | Skurnik et al. | |
| 6,459,896 B1 * | 10/2002 | Liebenow | H04M 1/72519 455/423 |
| 6,526,670 B1 * | 3/2003 | Carli | B23Q 17/20 33/503 |
| 7,500,119 B2 * | 3/2009 | Tsai | G06F 1/3215 713/300 |
| 7,821,420 B2 * | 10/2010 | Woollett | G01B 21/047 340/870.01 |
| 8,494,027 B2 * | 7/2013 | Bulled | H04W 52/0229 375/132 |
| 10,193,979 B2 * | 1/2019 | Laflen | G06F 13/42 |
| 2003/0107475 A1 * | 6/2003 | Bautista | H04W 52/0229 340/7.35 |

(Continued)

FOREIGN PATENT DOCUMENTS

| | | |
|---|---|---|
| EP | 2 056 480 A1 | 5/2009 |
| JP | 62-66103 | 3/1987 |
| JP | 10-47942 | 2/1998 |

*Primary Examiner* — Hoa Q Pham
(74) *Attorney, Agent, or Firm* — Oblon, McClelland, Maier & Neustadt, L.L.P.

(57) ABSTRACT

A measurement apparatus includes a measuring probe, a power supply provided to the measuring probe, a first communication circuit supplied power from the power supply and configured to perform communication of a type-1 signal via a first communication, the type-1 signal containing information regarding measurement performed in the measuring probe, and a second communication circuit supplied power from the power supply and configured to perform communication of a type-2 signal via a second communication, the type-2 signal containing information regarding power supply performed in the power supply, the second communication being more reliable than the first communication.

10 Claims, 5 Drawing Sheets

(56) References Cited

U.S. PATENT DOCUMENTS

| | | | |
|---|---|---|---|
| 2007/0015465 A1* | 1/2007 | Giroud | G06K 19/0705 455/41.2 |
| 2009/0070585 A1* | 3/2009 | Prestidge | H04L 9/3271 713/168 |
| 2014/0312880 A1* | 10/2014 | Radermacher | G01R 31/44 324/76.11 |
| 2019/0004092 A1* | 1/2019 | Hemmings | G01B 21/047 |
| 2019/0145764 A1* | 5/2019 | Atherton | G01B 21/047 33/503 |

* cited by examiner ized within the probe and emitting a transmission containing information regarding the stylus position, and a remote receiver receiving the transmission from the wireless transmission means. The probe includes first means configured to detect a low battery condition of the probe and second means configured to wirelessly transmit information regarding the battery condition of the probe detected by the first means to the remote receiver.

MEASUREMENT APPARATUS AND MEASUREMENT SYSTEM

BACKGROUND OF THE INVENTION

Field of the Invention

The present invention relates to a measurement apparatus and a measurement system.

Description of the Background Art

Conventional measurement apparatuses encompass, for example, an inspection apparatus disclosed in Japanese Patent Laying-Open No. S62-66103. This inspection apparatus includes a battery-operated probe with a movable stylus, wireless transmission means disposed within the probe and emitting a transmission containing information regarding the stylus position, and a remote receiver receiving the transmission from the wireless transmission means. The probe includes first means configured to detect a low battery condition of the probe and second means configured to wirelessly transmit information regarding the battery condition of the probe detected by the first means to the remote receiver.

Furthermore, Japanese Patent Laying-Open No. H10-47942 discloses a method and an apparatus for reducing power consumption of an electronic measurement system.

SUMMARY OF THE INVENTION

In addition to the above-mentioned apparatus disclosed in Japanese Patent Laying-Open No. S62-66103, various other measurement apparatuses equipped with a measuring probe are in practical use.

While such a measurement apparatus is performing a sequence of measurement using its measuring probe, if the power supply capacity of the apparatus for supplying power to the measuring probe becomes insufficient, there is a potential for loss of information including setup information, which is stored in the measuring probe, and status information, which indicates the current status of the measuring probe. If the loss of information occurs, the sequence of measurement will not be completed even after the power supply capacity for the measuring probe is restored. As a result, measurement data previously acquired will become of no use.

An object of the present invention is to solve the above-described problem and to provide a measurement apparatus and a measurement system capable of ensuring continuity of measurement performed with a measuring probe.

The measurement apparatus according to the present invention includes: a measuring probe; a power supply unit provided to the measuring probe; a first communication unit supplied power from the power supply unit and configured to perform communication of a type-1 signal via first communication means, the type-1 signal containing information regarding measurement performed in the measuring probe; and a second communication unit supplied power from the power supply unit and configured to perform communication of a type-2 signal via second communication means, the type-2 signal containing information regarding power supply performed in the power supply unit, the second communication means being more reliable than the first communication means.

The measurement system according to the present invention includes the above-described measurement apparatus and a control apparatus configured to perform communication of a signal with the first communication unit and the second communication unit.

According to the present invention, a measurement apparatus and a measurement system capable of ensuring continuity of measurement performed with a measuring probe can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
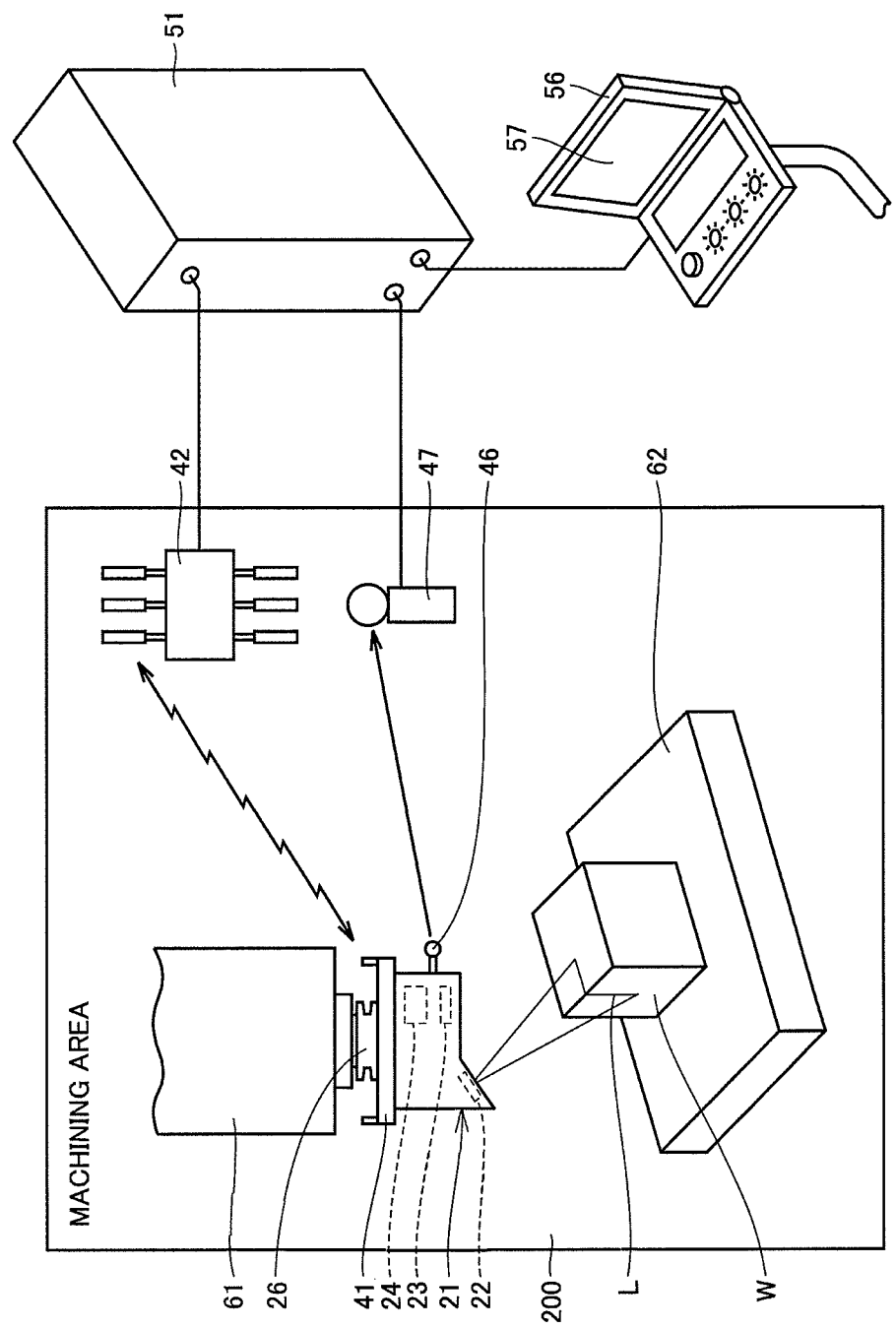
FIG. 1 schematically illustrates a measurement apparatus and a measurement system according to an embodiment of the present invention.

Embodiments of the present invention will be described with reference to the drawings. In the drawings referenced below, the same or equivalent members are denoted by the same numerals.

Figure 2:
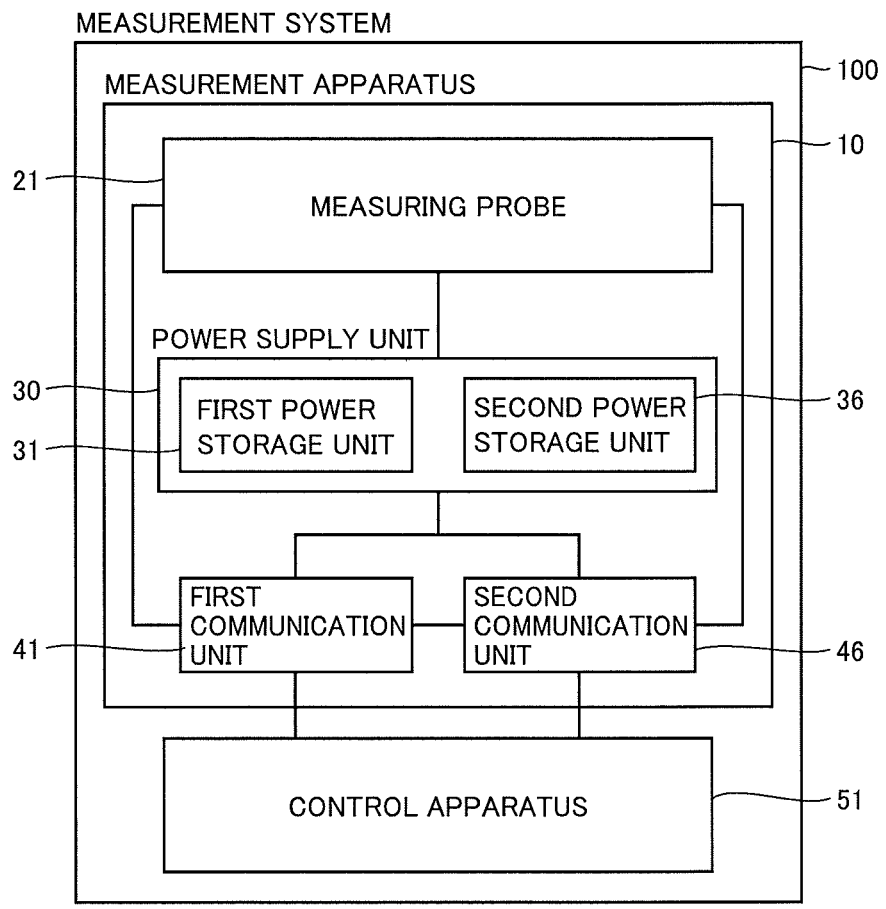
FIG. 2 is a block diagram illustrating the configuration of the measurement apparatus and the measurement system of FIG. 1.

FIG. 1 schematically illustrates a measurement apparatus and a measurement system according to an embodiment of the present invention. FIG. 2 is a block diagram illustrating the configuration of the measurement apparatus and the measurement system of FIG. 1.

First, referring to FIGS. 1 and 2, a description will be given of the overall configuration of a measurement apparatus 10 and a measurement system 100 according to the present embodiment. Measurement apparatus 10 is an apparatus configured to measure the three-dimensional profile of a workpiece on a machine tool.

As the machine tool, a numerical control (NC) machine tool is used that adopts computerized numerical control to automatically control various operations of workpiece machining.

Although the machine tool intended to be used in FIG. 1 is a vertical machining center, the machine tool is not limited to a vertical machining center. The machine tool may be, for example, a horizontal machining center or a multifunction machine tool having a turning function and a milling function.

Measurement apparatus 10 includes a measuring probe 21, a power supply unit 30, a first communication unit 41, and a second communication unit 46.

Measuring probe 21 has an installation adaptor 26. Installation adaptor 26 is an adaptor used for installing measuring probe 21 on a spindle 61 of the machine tool. Installation adaptor 26 is composed of, for example, a shank that is under surface constraint exerted by spindle 61 and a pull bolt that is connected to the rear end of the shank and designed to be pulled in the rotational axis direction of spindle 61.

A workpiece W is placed on a table 62 of the machine tool. Moving spindle 61 within a machining area 200 can change the three-dimensional, positional relation of measuring probe 21 to workpiece W at will. However, this configuration is not limitative. In an alternative possible configuration, for instance, moving both spindle 61 and table 62 changes the three-dimensional, positional relation of measuring probe 21 to workpiece W.

Measuring probe 21 measures the three-dimensional profile of workpiece W by a light section method. Measuring probe 21 includes an emitting apparatus 22, a light-receiving apparatus 23, and a storage unit (memory) 24.

Emitting apparatus 22 includes a laser source. Emitting apparatus 22 emits laser light toward workpiece W. Emitting apparatus 22 emits a slit of a laser light L toward workpiece W. Light-receiving apparatus 23 includes a CMOS image sensor. Light-receiving apparatus 23 receives laser light L reflected by workpiece W.

Storage unit 24 stores, for example, setup information regarding set-up of measuring probe 21 and status information indicating the current status of measuring probe 21.

Power supply unit 30 is provided to measuring probe 21. Power supply unit 30 and measuring probe 21 together form an integral unit. Power supply unit 30 supplies power to measuring probe 21 (emitting apparatus 22, light-receiving apparatus 23, storage unit 24). Power supply unit 30 supplies power to first communication unit 41 and second communication unit 46.

Power supply unit 30 includes a first power storage unit 31 and a second power storage unit 36. Each of first power storage unit 31 and second power storage unit 36 includes a secondary battery adopted to repeated charging.

First communication unit 41 and second communication unit 46 are provided to measuring probe 21. First communication unit 41, second communication unit 46, and measuring probe 21 together form an integral unit. Each of first communication unit 41 and second communication unit 46 performs communication of a signal with a control apparatus 51, which is described below.

Measurement apparatus 10 is a single-piece apparatus composed of measuring probe 21, power supply unit 30, first communication unit 41, and second communication unit 46.

Measurement system 100 includes measurement apparatus 10 described above, control apparatus 51, a display apparatus 57, a first relay unit 42, and a second relay unit 47.

Control apparatus 51 controls measurement apparatus 10. Control apparatus 51 is a control panel installed on the machine tool and configured to control various operations of the machine tool.

Display apparatus 57 displays the operating state of measuring probe 21 and the measurement condition settings of measuring probe 21. Display apparatus 57 forms an integral unit with an operational panel 56, which is installed on the machine tool and receives commands from the operator of the machine tool. However, display apparatus 57 is not limited to the one that forms an integral unit with operational panel 56. Alternatively, a display apparatus specifically designed for measurement apparatus 10 may be used.

First relay unit 42 and second relay unit 47 are disposed within machining area 200 of the machine tool. First relay unit 42 relays communication between first communication unit 41 and control apparatus 51. Second relay unit 47 relays communication between second communication unit 46 and control apparatus 51. First communication unit 41 and second communication unit 46 communicate with first relay unit 42 and second relay unit 47, respectively, via the wireless system. First relay unit 42 and second relay unit 47 communicate with control apparatus 51 via the wire system.

Next, first communication unit 41 and second communication unit 46 will be described in detail. First communication unit 41 communicates a signal via first communication means. Second communication unit 46 communicates a signal via second communication means.

The second communication means of second communication unit 46 is different from the first communication means of first communication unit 41. The second communication means of second communication unit 46 is more reliable than the first communication means of first communication unit 41.

More specifically, the delay in communication of a signal via the second communication means is smaller than the delay in communication of a signal via the first communication means. Communication of a signal via the second communication means ensures simultaneous (real-time) transmission and reception between measuring probe 21 and control apparatus 51, while communication of a signal via the first communication means does not ensure such simultaneity.

The amount of power consumption of the second communication means is lower than the amount of power consumption of the first communication means. Under the same communication conditions, the amount of power consumption of the second communication means is lower than the amount of power consumption of the first communication means.

The first communication means of first communication unit 41 is Wi-Fi (registered trademark). The second communication means of second communication unit 46 is optical wireless communication.

In the configuration in which MIMO (multiple input multiple output) is adopted for the first communication means, which is Wi-Fi, so as to eliminate the effect of multipath fading (namely, fluctuations in reception levels due to multipath use) and to increase the communication speed, the amount of power consumption of the first communication means is significantly increased.

In the present invention, the delay in communication and the amount of power consumption are not the only indices for determining that the second communication means is more reliable than the first communication means. For instance, the second communication means may be more resistant than the first communication means against communication interference caused by external radio waves.

In the configuration in which the first communication means is Wi-Fi, first relay unit 42 is a Wi-Fi transceiver that receives a radio wave from first communication unit 41 and transmits a signal toward control apparatus 51. In the configuration in which the second communication means is optical wireless communication, second relay unit 47 is an optical transceiver that receives light (such as infrared light) from second communication unit 46 and transmits a signal toward control apparatus 51.

The second communication means of second communication unit 46 is not limited to optical wireless communication and may be, for example, wire-based Ethernet (registered trademark).

First communication unit 41 communicates a type-1 signal containing information regarding measurement performed in measuring probe 21. The type-1 signal contains, as the information regarding measurement performed in measuring probe 21, control data used for controlling operation of measuring probe 21 and measurement data acquired by measuring probe 21.

The control data used for controlling operation of measuring probe 21 is transmitted from control apparatus 51 toward measuring probe 21 according to a command made on operational panel 56 by the operator. Examples of the control data used for controlling operation of measuring probe 21 include a calibration file dedicated to measuring probe 21, ON/OFF of laser light emitted by emitting apparatus 22, and ON/OFF of light reception performed by light-receiving apparatus 23.

The measurement data acquired by measuring probe 21 is transmitted from measuring probe 21 toward control apparatus 51. Examples of the measurement data acquired by measuring probe 21 include image information acquired by light-receiving apparatus 23 regarding reflected light reflected from a workpiece.

Second communication unit 46 communicates a type-2 signal containing information regarding power supply performed in power supply unit 30.

The type-2 signal contains, as the information regarding power supply performed in power supply unit 30, remaining capacity or the amount of power stored in first power storage unit 31, usage history (the number of charge-discharge cycles), voltage, and discharge current. The type-2 signal may further contain the temperature of first power storage unit 31, the serial number, and/or the like.

The type-2 signal may further contain various other types of information regarding second power storage unit 36, similar to the above-mentioned types of information regarding first power storage unit 31.

The type-2 signal further contains information regarding the timing of acquisition of the measurement data by measuring probe 21. The type-2 signal may contain, for example, a sync signal that conveys the timing of acquisition of the measurement data by measuring probe 21.

Control apparatus 51 receives the type-1 signal, which contains measurement data acquired by measuring probe 21, from first communication unit 41 and receives the type-2 signal, which contains information regarding the timing of acquisition of the measurement data by measuring probe 21, from second communication unit 46. Control apparatus 51 associates the measurement data acquired by measuring probe 21 with information regarding the position of measuring probe 21 at the timing of acquisition of the measurement data, and thereby calculates the three-dimensional coordinate for the surface profile of the workpiece.

In the present embodiment, second communication unit 46, which communicates the type-2 signal containing information regarding power supply performed in power supply unit 30, is a separate unit from first communication unit 41, which communicates the type-1 signal containing information regarding measurement performed in measuring probe 21. The second communication means of second communication unit 46, which is optical wireless communication, is more reliable than the first communication means of first communication unit 41, which is Wi-Fi, and therefore information regarding power supply performed in power supply unit 30 may be transmitted to control apparatus 51 with a higher reliability. This configuration enables countermeasures to be taken as appropriate when power supply capacity of power supply unit 30 becomes insufficient, as described below, and may thereby ensure continuity of measurement performed with measuring probe 21.

In the present embodiment, first communication unit 41 communicates the type-1 signal containing information regarding measurement performed in measuring probe 21 (the control data used for controlling operation of measuring probe 21, the measurement data acquired by measuring probe 21) via Wi-Fi, which is adapted to high-capacity communication. This configuration enables necessary data communication to be performed with a higher reliability even when data traffic between measuring probe 21 and control apparatus 51 has increased during measurement of the three-dimensional profile of a workpiece.

In the present embodiment, second communication unit 46 communicates the type-2 signal, which contains information regarding the timing of acquisition of the measurement data by measuring probe 21, via optical wireless communication having ensured simultaneity (real-time capability). This configuration allows for accurate association of the measurement data acquired by measuring probe 21 with the information regarding the position of measuring probe 21 at the timing of acquisition of the measurement data, and thereby may improve accuracy of measuring the three-dimensional profile of a workpiece.

Figure 3:
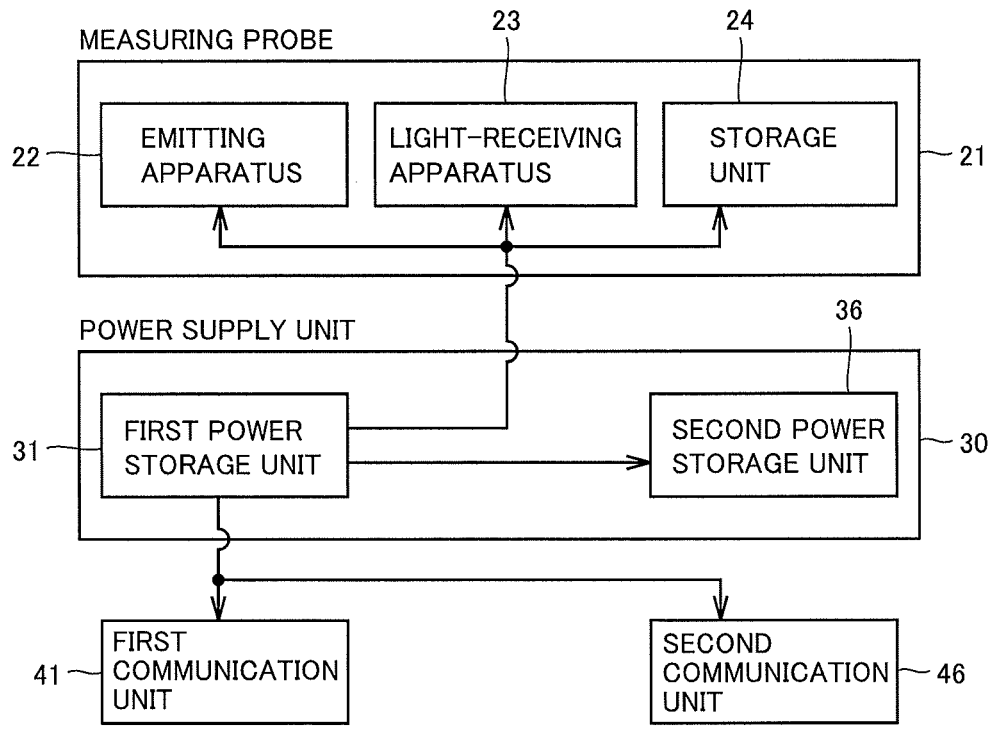
FIG. 3 is a block diagram illustrating power supply from a power supply unit during normal operation.
Figure 4:
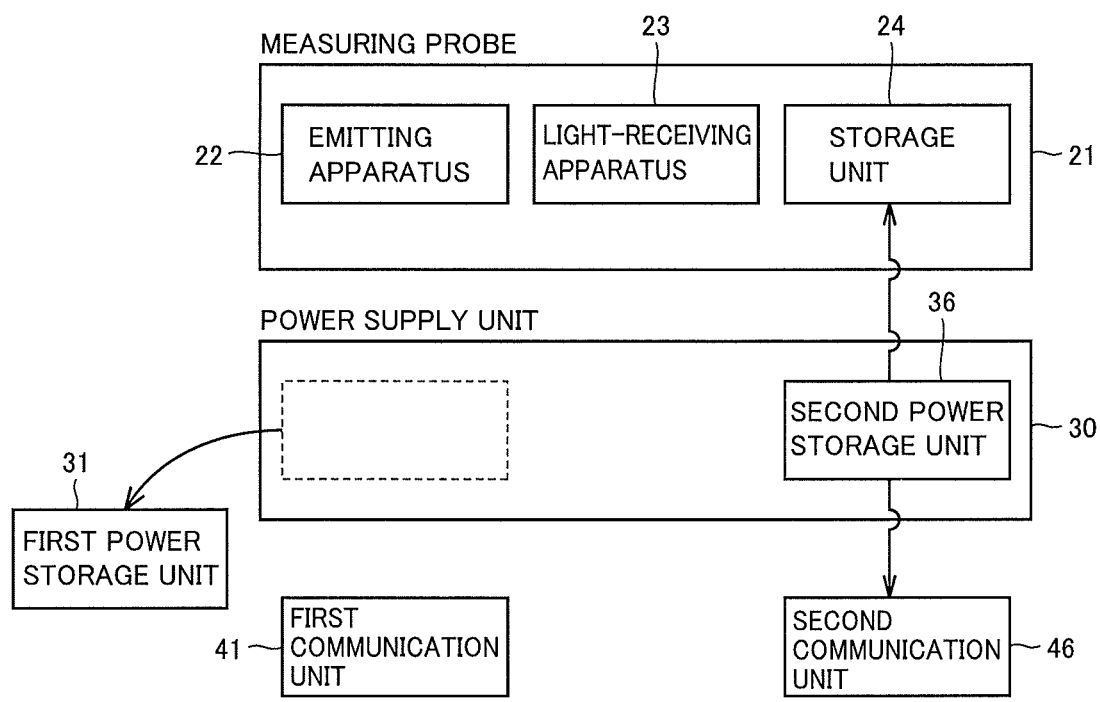
FIG. 4 is a block diagram illustrating power supply from a power supply unit while power supply capacity is insufficient.

Next, power supply unit 30 (first power storage unit 31, second power storage unit 36) will be described in detail. FIG. 3 is a block diagram illustrating power supply from the power supply unit during normal operation. FIG. 4 is a block diagram illustrating power supply from the power supply unit while power supply capacity is insufficient.

Referring to FIGS. 3 and 4, first power storage unit 31 is detachably attached to measuring probe 21. Second power storage unit 36 is a separate unit from first power storage unit 31. Second power storage unit 36 is fixed to measuring probe 21 in a nondetachable fashion. The charge capacity of second power storage unit 36 may be lower than the charge capacity of first power storage unit 31.

Referring to FIGS. 2 and 3, while a sufficient amount of power is stored in first power storage unit 31, first power storage unit 31 supplies power to measuring probe 21 (emitting apparatus 22, light-receiving apparatus 23, and storage unit 24). First power storage unit 31 supplies power to first communication unit 41 and second communication unit 46.

First power storage unit 31 supplies power to second power storage unit 36. Second power storage unit 36 is charged by power supply from first power storage unit 31.

Referring to FIG. 2 and FIG. 4, control apparatus 51 receives the type-2 signal containing information regarding power supply performed in power supply unit 30 via second communication unit 46.

When control apparatus 51 determines based on the type-2 signal that the power supply capacity of power supply unit 30 is insufficient, control apparatus 51 controls power supply unit 30 to supply power solely to second communication unit 46 among first communication unit 41 and second communication unit 46. More specifically, when control apparatus 51 determines based on the type-2 signal that the amount of power stored in first power storage unit 31 is insufficient, control apparatus 51 controls second power storage unit 36 to supply power solely to second communication unit 46 among first communication unit 41 and second communication unit 46.

When the amount of power stored in first power storage unit 31 becomes insufficient during measurement of the three-dimensional profile of a workpiece, second power storage unit 36 supplies power to second communication unit 46. Second power storage unit 36 supplies power to storage unit 24.

Figure 5:
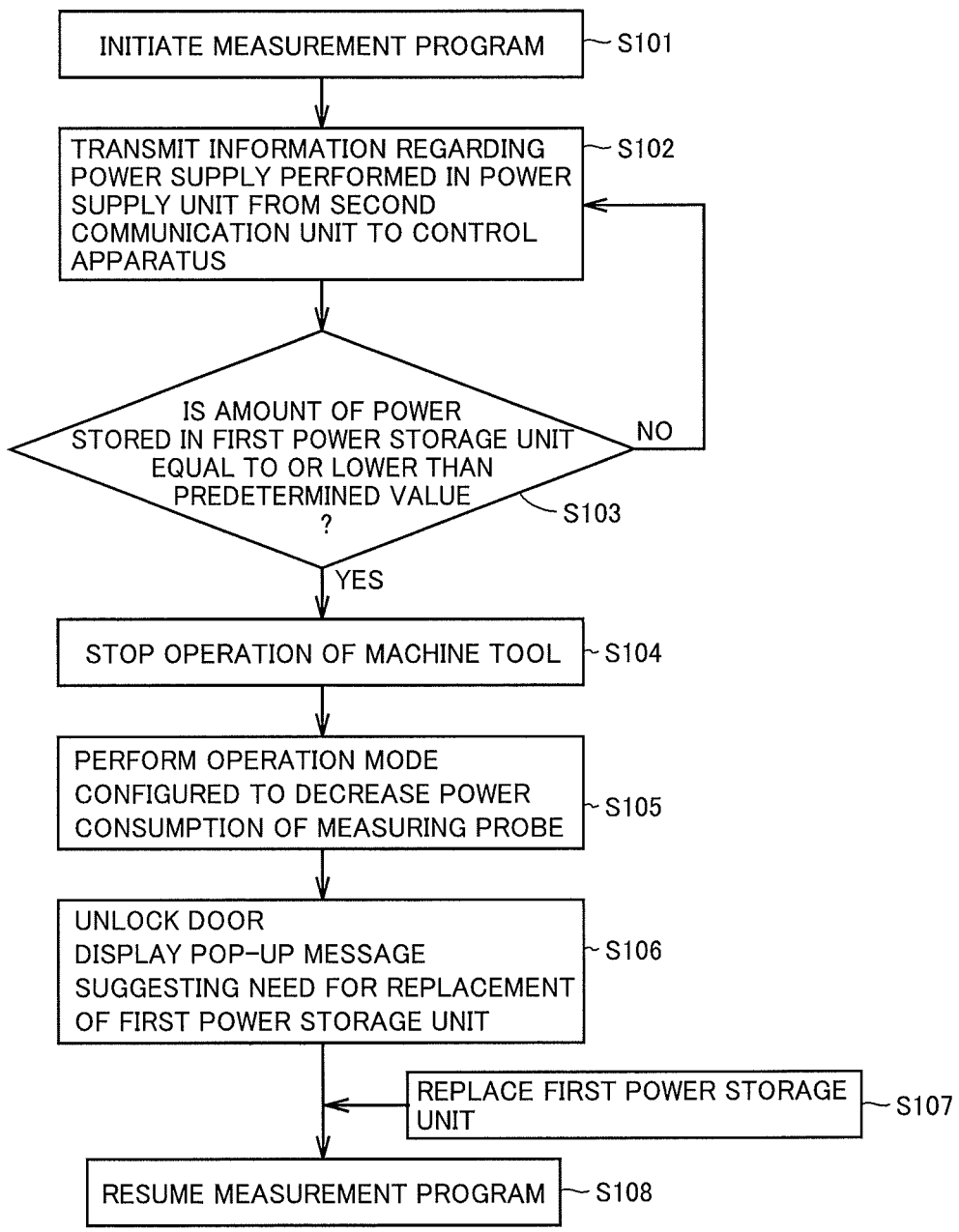
FIG. 5 is a flowchart illustrating the procedure of measurement of the three-dimensional profile of a workpiece that is performed while the amount of power stored in a first power storage unit is insufficient.

FIG. 5 is a flowchart illustrating the procedure of measurement of the three-dimensional profile of a workpiece performed while the amount of power stored in the first power storage unit is insufficient.

Referring to FIGS. 2 and 5, control apparatus 51 initiates a measurement program configured to measure the three-dimensional profile of a workpiece (S101). Measuring probe 21 receives, at first communication unit 41, the control data from control apparatus 51 and operates according to the measurement program.

While measuring probe 21 is operating according to the measurement program, second communication unit 46 transmits information regarding power supply performed in power supply unit 30 toward control apparatus 51 (S102).

Based on the received information regarding power supply performed in power supply unit 30, control apparatus 51 determines if the amount of power stored in first power storage unit 31 is equal to or lower than a predetermined value (S103). When control apparatus 51 determines that the amount of power stored in first power storage unit 31 is higher than the predetermined value, the procedure returns to step S102. When control apparatus 51 determines that the amount of power stored in first power storage unit 31 is equal to or lower than the predetermined value, the procedure proceeds to step S104, which is described below.

Control apparatus 51 stops operation of the machine tool (S104). Control apparatus 51 performs an operation mode configured to decrease power consumption of measuring probe 21 (S105).

In step S105, control apparatus 51 suspends communication of signals performed by first communication unit 41, halts output of laser light performed by emitting apparatus 22, and halts power supply to light-receiving apparatus 23.

In other words, in the present embodiment, measurement of the three-dimensional profile of a workpiece with measuring probe 21 is suspended. While the measurement is suspended, communication by first communication unit 41 of information regarding measurement performed in measuring probe 21 and communication by second communication unit 46 of information regarding the timing of acquisition of the measurement data by measuring probe 21 are suspended. Second communication unit 46 continues communication of information regarding power supply performed in power supply unit 30.

Control apparatus 51 unlocks a door that is adapted to open and close machining area 200. Control apparatus 51 displays a pop-up message on display apparatus 57, and the pop-up message suggests the need for replacement of first power storage unit 31 (S106) Display apparatus 57 is not the only signaling means for informing the operator of the need for replacement of first power storage unit 31. Examples of an alternative signaling means may include turning on a signal lamp installed on the machine tool and producing a signal sound.

First power storage unit 31 is replaced (S107). Specifically, the operator opens the door and detaches first power storage unit 31 from measuring probe 21. The operator installs another, charged, first power storage unit 31 on measuring probe 21.

Control apparatus 51 resumes the measurement program (S108). Specifically, the operator performs an action such as pressing down an operation button located on operational panel 56 to resume the measurement program.

Although the present embodiment is of a configuration in which first power storage unit 31 is replaced manually by the operator, the present invention is not limited to this configuration. Alternatively, for instance, a replacement station designed for replacement of the power storage unit may be installed on the machine tool and first power storage unit 31 may be automatically replaced according to a command from control apparatus 51.

In the present embodiment, in step S103, when it is determined that the amount of power stored in first power storage unit 31 is equal to or lower than a predetermined value, second power storage unit 36 supplies power to second communication unit 46 and storage unit 24.

This allows replacement of first power storage unit 31 to be performed while power is supplied from second power storage unit 36 to second communication unit 46 to allow second communication unit 46 to continue communicating information regarding power supply performed in power supply unit 30. The power supply from second power storage unit 36 to storage unit 24 may prevent loss of various types of information stored in storage unit 24.

In the configuration in which the operator regularly maintains the remaining capacity or the amount of power stored in first power storage unit 31, the quality of maintenance largely depends on the operator. Besides, if the power supply capacity of power supply unit 30 is lost during measurement of the three-dimensional profile of a workpiece, various types of information stored in storage unit 24 will be lost. When the loss of information occurs, the measurement will not be completed even after the power supply capacity of power supply unit 30 is restored. As a result, measurement data previously acquired will become of no use. The present embodiment has an effect to allow for easy maintenance of the remaining capacity or the amount of power stored in first power storage unit 31 in measuring probe 21 as well as an effect to allow for continuation of measurement of the three-dimensional profile of a workpiece after the power supply capacity of power supply unit 30 is restored.

In the present embodiment, in step S105, control apparatus 51 performs the operation mode configured to decrease power consumption of measuring probe 21. This may mitigate a decrease in the amount of power stored in second power storage unit 36 while first power storage unit 31 is being replaced.

In step S105, control apparatus 51 may suspend part of the communication of signals performed by first communication unit 41 and/or second communication unit 46 and reduce output of laser light performed by emitting apparatus 22. In this configuration, measurement of the three-dimensional profile of a workpiece with measuring probe 21 is continued while power consumption during replacement of first power storage unit 31 may be minimized.

Figure 6:
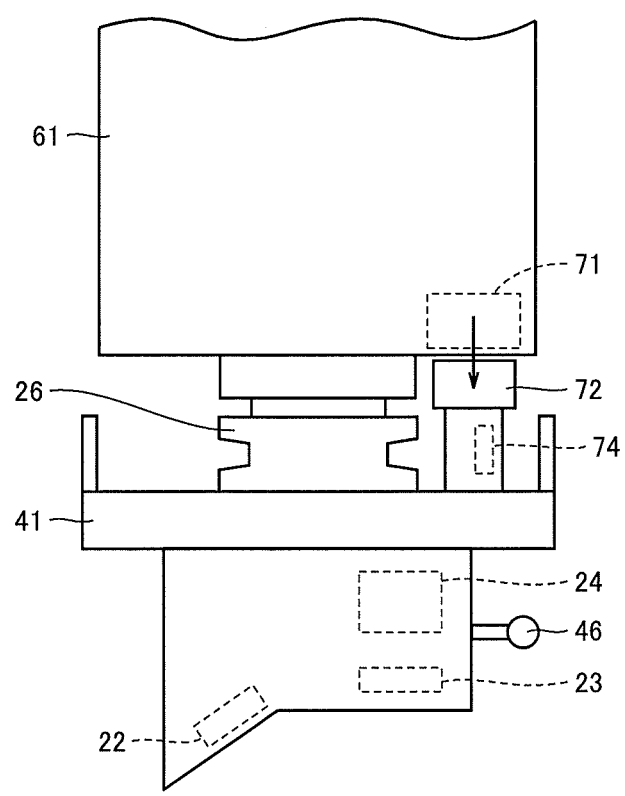
FIG. 6 illustrates a variation of a power supply unit.

FIG. 6 illustrates a variation of a power supply unit. Referring to FIG. 6, power supply unit 30 in this variation includes a power-receiving unit 72 and a current sensor 74 instead of first power storage unit 31 and second power storage unit 36.

Spindle 61 of the machine tool includes a power-supplying unit 71. Power-receiving unit 72 and power-supplying unit 71 together constitute a noncontact power-supplying mechanism. Upon installation of measuring probe 21 on spindle 61, power-receiving unit 72 is positioned close to power-supplying unit 71. Then, power is supplied from power-supplying unit 71 to power-receiving unit 72.

Current sensor 74 detects the value of current flowing from power-supplying unit 71 to power-receiving unit 72. If, for instance, power-supplying unit 71 and power-receiving unit 72 are misaligned or foreign matter such as chips is present between power-supplying unit 71 and power-receiving unit 72, the value of current detected with current sensor 74 decreases.

Second communication unit 46 communicates, as the information regarding power supply performed in power supply unit 30, the type-2 signal containing the value of current detected with current sensor 74. When control apparatus 51 determines based on the type-2 signal that the power supply capacity of power supply unit 30 is insufficient, control apparatus 51 controls power supply unit 30 to supply power solely to second communication unit 46 among first communication unit 41 and second communication unit 46.

In this configuration, a step corresponding to step S107 in FIG. 5 is performed to correct the positional relation between power-supplying unit 71 and power-receiving unit 72 and/or remove foreign matter present between power-supplying unit 71 and power-receiving unit 72. By this step, the power supply capacity of power supply unit 30 may be restored.

Next, the configurations according to the present invention and the effects of the present invention will be summarized.

The measurement apparatus according to the present invention includes: a measuring probe; a power supply unit provided to the measuring probe; a first communication unit supplied power from the power supply unit and configured to perform communication of a type-1 signal via first communication means, where the type-1 signal contains information regarding measurement performed in the measuring probe; and a second communication unit supplied power from the power supply unit and configured to perform communication of a type-2 signal via second communication means, where the type-2 signal contains information regarding power supply performed in the power supply unit and the second communication means is more reliable than the first communication means.

In the measurement apparatus thus configured, the second communication unit, which communicates the type-2 signal containing information regarding power supply performed in the power supply unit, is a separate unit from the first communication unit, which communicates the type-1 signal containing information regarding measurement performed in the measuring probe. The second communication means of the second communication unit is more reliable than the first communication means of the first communication unit and, therefore, the type-2 signal containing information regarding power supply performed in the power supply unit may be communicated with a higher reliability. The information thus communicated from the second communication unit, regarding power supply performed in the power supply unit, enables various countermeasures to be taken. Therefore, this configuration is capable of ensuring continuity of measurement performed with the measuring probe.

Preferably, the delay in communication of a signal via the second communication means is smaller than the delay in communication of a signal via the first communication means. Preferably, the amount of power consumption of the second communication means is lower than the amount of power consumption of the first communication means. Preferably, the first communication means is Wi-Fi (registered trademark) and the second communication means is optical wireless communication.

In the measurement apparatus thus configured, the second communication unit enables communication of the type-2 signal, which contains information regarding power supply performed in the power supply unit, to be performed with a higher reliability.

Preferably, the measuring probe measures the three-dimensional profile of a workpiece by a light section method. The type-1 signal contains control data used for controlling operation of the measuring probe and measurement data acquired by the measuring probe. The type-2 signal further contains information regarding the timing of acquisition of the measurement data by the measuring probe.

In the measurement apparatus thus configured, the second communication unit enables communication of the type-2 signal, which further contains information regarding the timing of acquisition of the measurement data by the measuring probe, to be performed with a higher reliability.

The measurement system according to the present invention includes any of the measurement apparatuses described above and a control apparatus configured to perform communication of a signal with the first communication unit and the second communication unit.

The measurement system thus configured may be a measurement system capable of ensuring continuity of measurement with a measuring probe.

Preferably, when the control apparatus determines based on the type-2 signal that the power supply capacity of the power supply unit is insufficient, the control apparatus controls the power supply unit to supply power solely to the second communication unit among the first communication unit and the second communication unit.

In the measurement system thus configured, even while the power supply capacity of the power supply unit is insufficient, the second communication unit allows for communication of the type-2 signal containing information regarding power supply performed in the power supply unit.

Preferably, the power supply unit includes a first power storage unit detachably attached to the measuring probe as well as a second power storage unit. When the control apparatus determines based on the type-2 signal that the amount of power stored in the first power storage unit is insufficient, the control apparatus controls the second power storage unit to supply power solely to the second communication unit among the first communication unit and the second communication unit.

In the measurement system thus configured, when it is determined that the amount of power stored in the first power storage unit is insufficient, replacement of the first power storage unit may be performed while power is being supplied from the second power storage unit to the second communication unit to enable the second communication unit to continue communication of the type-2 signal.

Preferably, when the control apparatus determines based on the type-2 signal that the power supply capacity of the power supply unit is insufficient, the control apparatus controls at least one of the measuring probe, the first communication unit, and the second communication unit to perform an operation mode configured to decrease power consumption of measurement with the measuring probe.

In the measurement system thus configured, power consumption of at least one of the measuring probe, the first communication unit, and the second communication unit may be reduced while the power supply capacity of the power supply unit is insufficient.

Preferably, the measuring probe includes an emitting apparatus configured to emit laser light toward a workpiece and a light-receiving apparatus configured to receive laser light reflected by the workpiece, and the measuring probe measures the three-dimensional profile of the workpiece by a light section method. The operation mode includes at least one of the following: suspending part or all of the communication of signals performed by the first communication unit and/or the second communication unit; reducing or halting output of laser light performed by the emitting apparatus; and halting power supply to the light-receiving apparatus.

By performing this operation mode, the measurement system thus configured is capable of reducing power consumption of at least one of the measuring probe, the first communication unit, and the second communication unit.

The present invention is applicable to, for example, a measurement apparatus configured to measure the three-dimensional profile of a workpiece.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A measurement apparatus comprising:
a measuring probe;
a power supply provided to the measuring probe;
a first communication circuit that is supplied power from the power supply and configured to perform communication of a type-1 signal via a first communication, the type-1 signal including information regarding measurement performed in the measuring probe; and
a second communication circuit that is supplied power from the power supply and configured to perform communication of a type-2 signal via a second communication, the type-2 signal including information regarding power supply performed in the power supply, the second communication being more reliable than the first communication, wherein
the power supply comprises a first power storage, and
the type-2 signal includes an amount of power stored in the first power storage as the information regarding power supply performed in the power supply.

2. The measurement apparatus according to claim 1, wherein a delay in communication of a signal via the second communication is smaller than a delay in communication of a signal via the first communication.

3. The measurement apparatus according to claim 1, wherein an amount of power consumption of the second communication is lower than an amount of power consumption of the first communication.

4. The measurement apparatus according to claim wherein
the first communication is Wi-Fi (registered trademark), and
the second communication is optical wireless communication.

5. The measurement apparatus according to claim 1, wherein
the measuring probe is configured to perform measurement of a three-dimensional profile of a workpiece by a light section method,
the type-1 signal includes control data and measurement data, the control data being data used for controlling operation of the measuring probe, the measurement data being data acquired by the measuring probe, and
the type-2 signal further includes information regarding a timing of acquisition of the measurement data by the measuring probe.

6. A measurement system comprising:
the measurement apparatus according to claim 1; and
control circuitry configured to perform communication of a signal with the first communication circuit and the second communication circuit.

7. The measurement system according to claim 6, wherein when the control circuitry determines based on the type-2 signal that power supply capacity of the power supply is insufficient, the control circuitry controls the power supply to supply power solely to the second communication circuit among the first communication circuit and the second communication circuit.

8. The measurement system according to claim 7, wherein the power supply comprises:
the first power storage detachably attached to the measuring probe; and
a second power storage, and
when the control circuitry determines based on the type-2 signal that an amount of power stored in the first power storage is insufficient, the control circuitry controls the second power storage to supply power solely to the second communication circuit among the first communication circuit and the second communication circuit.

9. The measurement system according to claim 6, wherein when the control circuitry determines based on the type-2 signal that power supply capacity of the power supply is insufficient, the control circuitry controls at least one of the measuring probe, the first communication circuit, and the second communication circuit to perform an operation mode configured to decrease power consumption of measurement with the measuring probe.

10. The measurement system according to claim 9, wherein
the measuring probe comprises:
an emitting apparatus that includes a laser source and is configured to emit laser light toward a workpiece; and
a light-receiving apparatus that includes an image sensor and is configured to receive laser light reflected by the workpiece,
the measuring probe is configured to measure a three-dimensional profile of the workpiece by a light section method, and
the operation mode includes at least one of:
suspending part or all of communication of signals performed by the first communication circuit and/or the second communication circuit;
reducing or halting output of laser light performed by the emitting apparatus; and
halting power supply to the light-receiving apparatus.

* * * * *